US012766611B2

(12) United States Patent
Jiang et al.

(10) Patent No.: US 12,766,611 B2
(45) Date of Patent: Oct. 20, 2026

(54) DRILLING TOOL FEATURING STABLE RADIAL CLAMPING

(71) Applicant: ZHUZHOU CEMENTED CARBIDE CUTTING TOOLS CO., LTD., Hunan (CN)

(72) Inventors: Aisheng Jiang, Hunan (CN); Liangxiong Xiang, Hunan (CN); Yuzhong Wang, Hunan (CN); Xingdong Xiang, Hunan (CN); Lan Ni, Hunan (CN); Peiwen Chen, Hunan (CN)

(73) Assignee: ZHUZHOU CEMENTED CARBIDE CUTTING TOOLS CO., LTD., Hunan (CN)

( * ) Notice: Subject to any disclaimer, the term of this patent is extended or adjusted under 35 U.S.C. 154(b) by 291 days.

(21) Appl. No.: 18/801,708

(22) Filed: Aug. 12, 2024

(65) Prior Publication Data

US 2025/0100055 A1 Mar. 27, 2025

(30) Foreign Application Priority Data

Sep. 26, 2023 (CN) ........................ 202311256059.2

(51) Int. Cl.

| | |
|---|---|
| ***B23B 51/00*** | (2006.01) |
| ***B23B 51/02*** | (2006.01) |
| *B23B 27/16* | (2006.01) |
| *B23B 29/08* | (2006.01) |
| *B23P 15/32* | (2006.01) |
| *B23P 15/38* | (2006.01) |

(52) U.S. Cl.

CPC .......... *B23B 51/0003* (2022.01); *B23B 51/02* (2013.01); *B23B 27/1614* (2013.01);

(Continued)

(58) Field of Classification Search

CPC ...... B23P 15/32; B23P 15/38; B23B 27/1614; B23B 27/1644; B23B 27/1662;

(Continued)

(56) References Cited

U.S. PATENT DOCUMENTS 6,582,164 B1 6/2003 McCormick
10,537,943 B2 * 1/2020 Jäger ...................... B23B 51/06

(Continued)

FOREIGN PATENT DOCUMENTS

CN 102847992 1/2013
CN 105537654 5/2016

(Continued)

*Primary Examiner* — Jermie E Cozart
(74) *Attorney, Agent, or Firm* — JCIPRNET

(57) ABSTRACT

A drilling tool includes a cutting component and a clamping component. The cutting component comprises a cutting part and a connecting part. The clamping component comprises a clamping part matched with the cutting component. In a direction away from the cutting part along a rotation center axis, the connecting part has first and second outer circumferential surfaces, and the clamping part has first and second inner circumferential surfaces. The first inner circumferential surface is matched with the first outer circumferential surface to form a first radial clamping structure, and the second inner circumferential surface is matched with the second outer circumferential surface to form a second radial clamping structure. The first and second radial clamping structures can independently achieving radial clamping of the cutting component by the clamping component, and an interference amount of the first radial clamping structure is greater than that of the second radial clamping structure.

20 Claims, 6 Drawing Sheets

(52) U.S. Cl.
CPC ....... *B23B 27/1644* (2013.01); *B23B 27/1662* (2013.01); *B23B 29/08* (2013.01); *B23B 51/0005* (2022.01); *B23B 2205/08* (2013.01); *B23B 2205/12* (2013.01); *B23B 2231/0204* (2013.01); *B23B 2240/32* (2013.01); *B23P 15/32* (2013.01); *B23P 15/38* (2013.01)

(58) Field of Classification Search
CPC . B23B 29/08; B23B 2205/08; B23B 2205/12; B23B 2231/0204; B23B 2240/32; B23B 51/0003; B23B 51/0005; B23B 51/02
See application file for complete search history.

(56) References Cited

U.S. PATENT DOCUMENTS

| | | | | |
|---|---|---|---|---|
| 11,110,521 | B2 * | 9/2021 | Hecht | B23B 51/00 |
| 2002/0159851 | A1 * | 10/2002 | Krenzer | B23B 51/02 408/233 |
| 2014/0017022 | A1 * | 1/2014 | Schwaegerl | B23B 51/00 408/231 |
| 2017/0028480 | A1 * | 2/2017 | Schwägerl | B23B 51/02 |
| 2019/0054548 | A1 | 2/2019 | Wacinski et al. | |
| 2021/0299760 | A1 * | 9/2021 | Jiang | B23B 51/0004 |

FOREIGN PATENT DOCUMENTS

| | | | | | |
|---|---|---|---|---|---|
| CN | 105537654 | B | * | 9/2017 | B23B 51/00 |
| CN | 109262026 | | | 1/2019 | |
| CN | 109262026 | A | * | 1/2019 | B23B 51/00 |
| CN | 109262027 | | | 1/2019 | |
| CN | 112388035 | | | 2/2021 | |
| CN | 113953564 | | | 1/2022 | |
| CN | 113953565 | B | * | 6/2023 | B23B 51/12 |
| EP | 2896478 | A1 | * | 7/2015 | B23B 51/02 |
| EP | 3427876 | A1 | * | 1/2019 | B23B 51/00 |

* cited by examiner

DRILLING TOOL FEATURING STABLE RADIAL CLAMPING

CROSS-REFERENCE TO RELATED APPLICATION

This application claims the priority benefit of China application serial no. 202311256059.2, filed on Sep. 26, 2023. The entirety of the above-mentioned patent application is hereby incorporated by reference herein and made a part of this specification.

BACKGROUND

Technical Field

The invention mainly relates to the field of machining of metals, in particular to a drilling tool featuring stable radial clamping.

Description of Related Art

In drilling processes, in order to extend the lifespan of the cutting portion, expensive hard alloy or similar materials are typically utilized as tool materials. These materials possess high hardness and excellent wear resistance properties, making the machining process highly challenging and resulting in higher material and processing costs for drilling tools.

To solve the aforementioned problem, drilling tools in the prior art typically adopt a modular structure, comprising cutting components and clamping components. The cutting components are made of hard alloy or similar materials with high hardness and strong wear resistance, while the clamping components are made of materials with great elasticity. By allowing for the separate replacement of worn cutting components, this design helps to reduce the cost of drilling operations. Such tools generally adopt a two-piece clamping structure, employing the elastic deformation of the clamping mechanism to open a small angle for clamping and positioning. Due to the existence of the small angle, in the prior art, the assembly of cutting components and clamping components only utilizes a single clamping unit, resulting in limited contact area and clamping force between them. As a consequence, the connection accuracy and strength are low, thus failing to satisfy the high precision and large length-to-diameter ratio drilling requirements. Additionally, the single clamping unit experiences excessive force, leading to fatigue damage in the clamping components and a low tool lifespan.

For example, Chinese patent CN109262027A discloses a drilling tool featuring stable clamping, with a transition fit between the outer circumferential surface of a cutting component and the inner circumferential surface of a clamping component. The fit between the outer circumferential surface and the inner circumferential surface essentially refers to the interference fit between an inner bore wall and an outer cylinder. Although this scheme achieves clamping of the cutting component by the clamping component, it relies solely on a single clamping unit to connect the cutting component and the clamping component. This results in limited clamping area, challenges in ensuring clamping accuracy and connection strength, and susceptibility to fatigue wear of the clamping component.

SUMMARY

The objective of the invention is to overcome the limitations of the prior art and provide a drilling tool featuring stable radial clamping, characterized by superior connection strength, high machining precision, convenient handling, long lifespan, and low production cost.

In order to solve the above technical problems, the technical scheme adopted by the invention is as follows.

A drilling tool featuring stable radial clamping, comprising a cutting component and a clamping component, wherein the cutting component comprises a cutting part and a connecting part; the clamping component comprises a handle part and a clamping part, two chip grooves are formed in the clamping part to form a two-piece clamping structure, and the cutting component is matched with the clamping part; in a direction away from the cutting part along a rotation center axis of the drilling tool, the connecting part is sequentially provided with a first outer circumferential surface and a second outer circumferential surface; in the direction away from the cutting part along the rotation center axis of the drilling tool, the clamping part is sequentially provided with a first inner circumferential surface and a second inner circumferential surface; the first inner circumferential surface is matched with the first outer circumferential surface to form a first radial clamping structure, and the second inner circumferential surface is matched with the second outer circumferential surface to form a second radial clamping structure; and the first radial clamping structure and the second radial clamping structure are capable of independently achieving radial clamping of the cutting component by the clamping component, and an interference amount of the first radial clamping structure is greater than that of the second radial clamping structure.

As a further improvement of the circuit of the present invention, the first radial clamping structure has an interference amount $\lambda 1$, the second radial clamping structure has an interference amount $\lambda 2$, and $0.005\ mm \leq \lambda 1 - \lambda 2 \leq 0.02\ mm$.

The length of the first outer circumferential surface along the rotation center axis of the drilling tool is L1, a length of the second outer circumferential surface along the rotation center axis of the drilling tool is L2, and $0.2\ mm \leq L1 - L2 \leq 1.5\ mm$.

On an axial section of the drilling tool, an included angle between the first outer circumferential surface and the rotation center axis of the drilling tool is al, an included angle between the first inner circumferential surface and the rotation center axis of the drilling tool is $\alpha 2$, and $0° < \alpha 1 - \alpha 2 < 1°$, $\alpha 2 = 0$.

On any axial section of the drilling tool, the second outer circumferential surface is parallel to the rotation center axis, and the second inner circumferential surface is parallel to the rotation center axis.

The circumferential recess is arranged between the first outer circumferential surface and the second outer circumferential surface, a circumferential protrusion is arranged between the first inner circumferential surface and the second inner circumferential surface, and the circumferential recess is matched with the circumferential protrusion.

The circumferential recess comprises a concave upper side, a concave bottom and a concave lower side which are arranged in sequence, the circumferential protrusion comprises a convex upper side, a convex top and a convex lower side which are arranged in sequence, and the concave bottom is matched with the convex top to form a third radial clamping structure.

On an axial section of the drilling tool, an included angle between the concave upper side and the concave lower side is $\beta 1$, an included angle between the convex upper side and the convex lower side is $\beta 2$, $45° \leq \beta 1 \leq 60°$ and $45° \leq \beta 2 \leq 60°$.

The cutting part is provided with a cutting part end surface, and the clamping part is provided with a clamping part end surface; and when the cutting component and the clamping component are assembled in place, a gap T1 exists between the cutting part end surface and the clamping part end surface, a gap T2 exists between the concave lower side and the convex lower side, and $0<T2-T1<0.2$ mm.

The connecting part is provided with a relief outer circumferential surface, the relief outer circumferential surface is arranged on a side, close to the rotation center axis, of the second outer circumferential surface, the clamping part is provided with a relief inner circumferential surface, and the relief inner circumferential surface is arranged on a side, away from the rotation center axis, of the second inner circumferential surface.

Compared with the prior art, the invention has the following advantages.

The drilling tool featuring stable radial clamping provided by the invention has two groups of radial clamping structures which are arranged radially away from the cutting part. The interference amount of the first radial clamping structure is greater than that of the second radial clamping structure, meaning that the first clamping structure has a greater clamping force compared to the second clamping structure, while the second clamping structure has a greater clamping area compared to the first clamping structure. The two groups of radial clamping structures work together, increasing the clamping area and clamping force during the assembly of the clamping component and the cutting component, thereby improving the connection strength of the tool. This ensures high drilling precision even under conditions of large length-to-diameter ratios and high feed rates. The two groups of radial clamping structures have different interference amounts, and the interference amount of the first clamping structure is greater than that of the second clamping structure, which facilitates assembly and effectively reduces the difficulty of tool manufacturing. The setting of the dual clamping structures can also effectively suppress the deflection of the cutting component caused by unstable clamping, greatly reducing fatigue damage to the clamping component and extending the lifespan of the tool.

DESCRIPTION OF THE EMBODIMENTS

The invention will be further described in detail with reference to the attached drawings and specific embodiments.

In the description of the invention, it should be noted that orientation or positional relationships indicated by terms such as "center", "up", "down", "inside", "outside", "top" and "bottom" are based on the orientation or positional relationships shown in the accompanying drawings, and are to facilitate the description of the invention and simplify the description only, rather than indicating or implying that the device or element referred to must have a specific orientation or be constructed and operated in a specific orientation, and therefore cannot be construed as limiting the invention.

Figure 1:
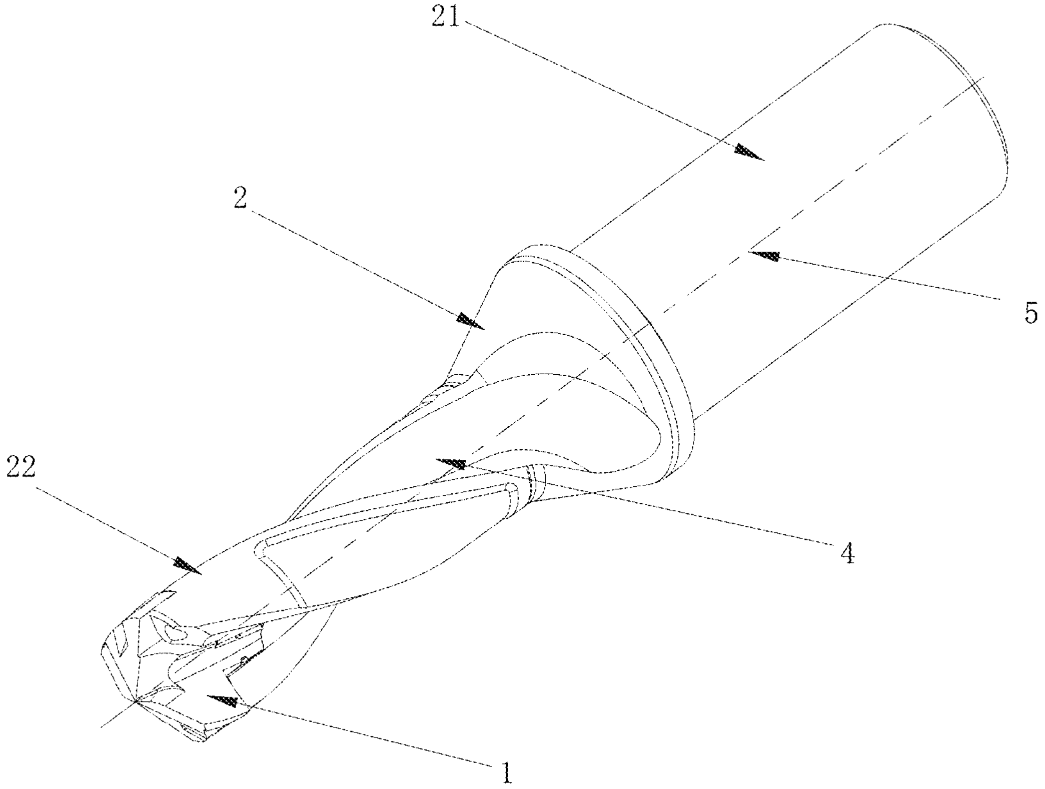
FIG. 1 is a perspective view of a drilling tool featuring stable radial clamping according to the invention.
Figure 2:
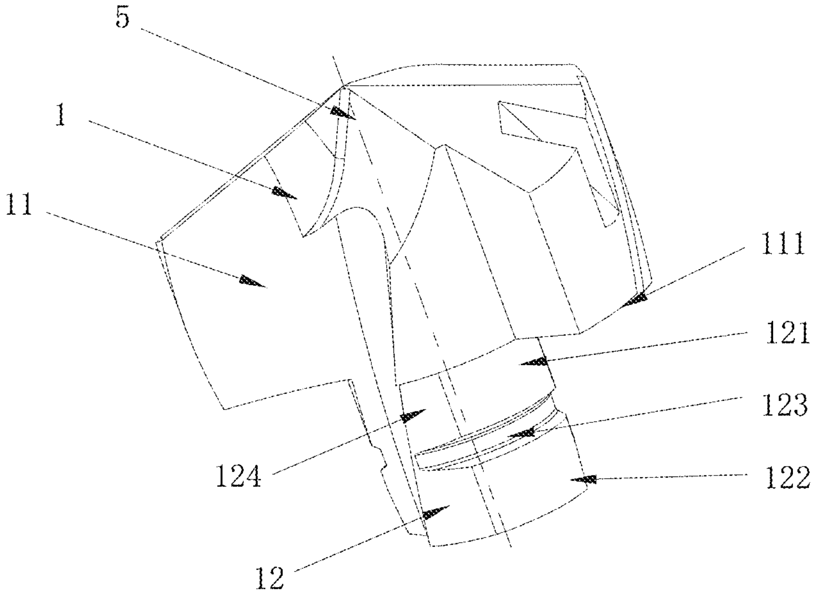
FIG. 2 is a perspective view of a cutting component of a drilling tool featuring stable radial clamping according to the invention.
Figure 3:
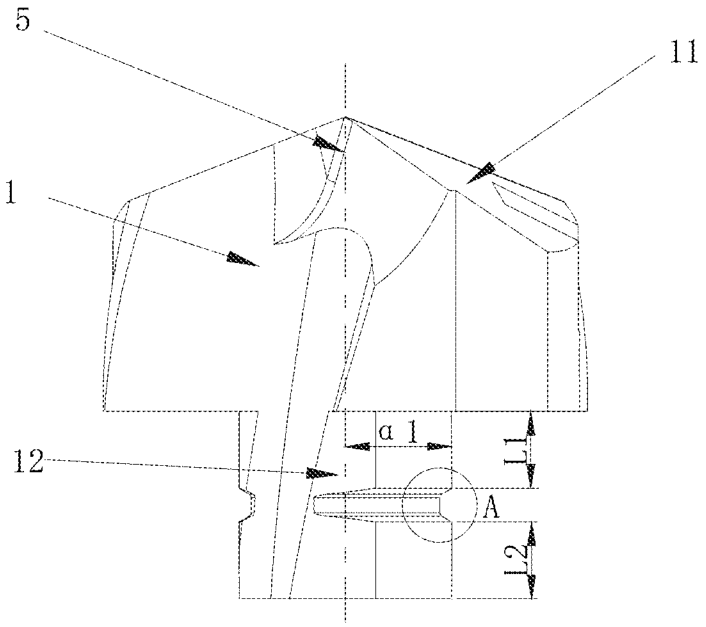
FIG. 3 is a front view of a cutting component of a drilling tool featuring stable radial clamping according to the invention.
Figure 4:
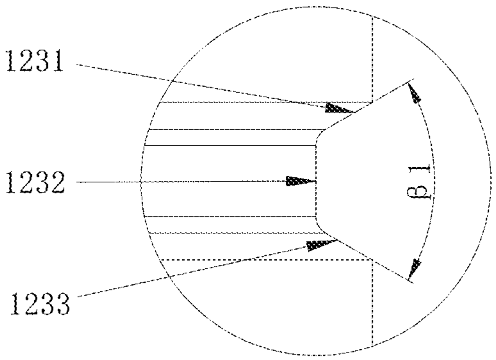
FIG. 4 is an enlarged view of A in FIG. 3.
Figure 5:
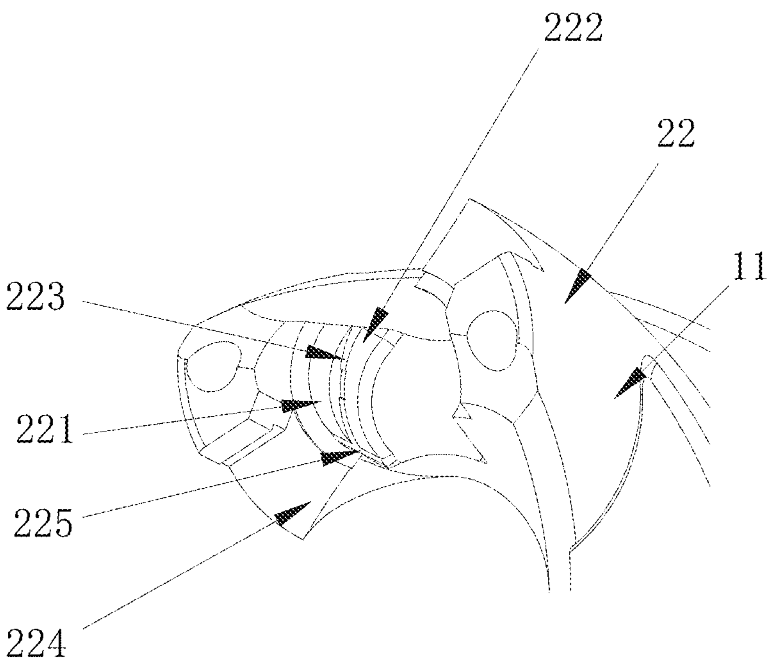
FIG. 5 is a perspective view of a connecting component of a drilling tool featuring stable radial clamping according to the invention.
Figure 6:
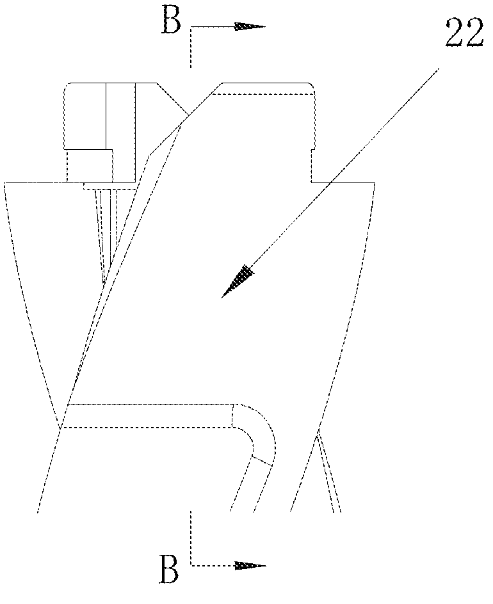
FIG. 6 is a front view of a connecting component of a drilling tool featuring stable radial clamping according to the invention.
Figure 7:
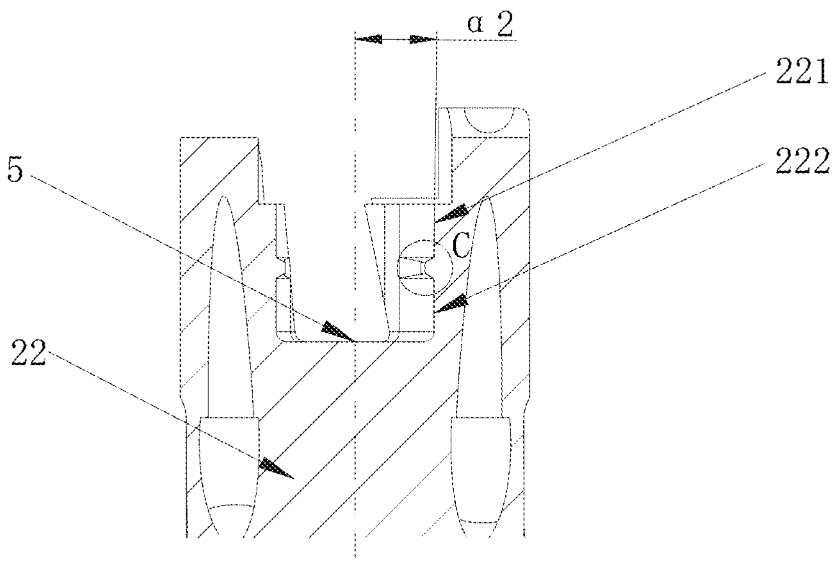
FIG. 7 is a sectional view of B-B in FIG. 6.
Figure 8:
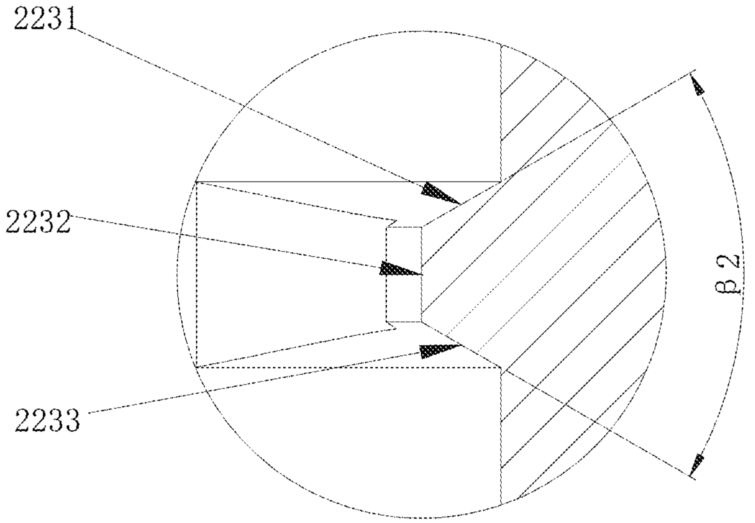
FIG. 8 is an enlarged view of C in FIG. 7.
Figure 9:
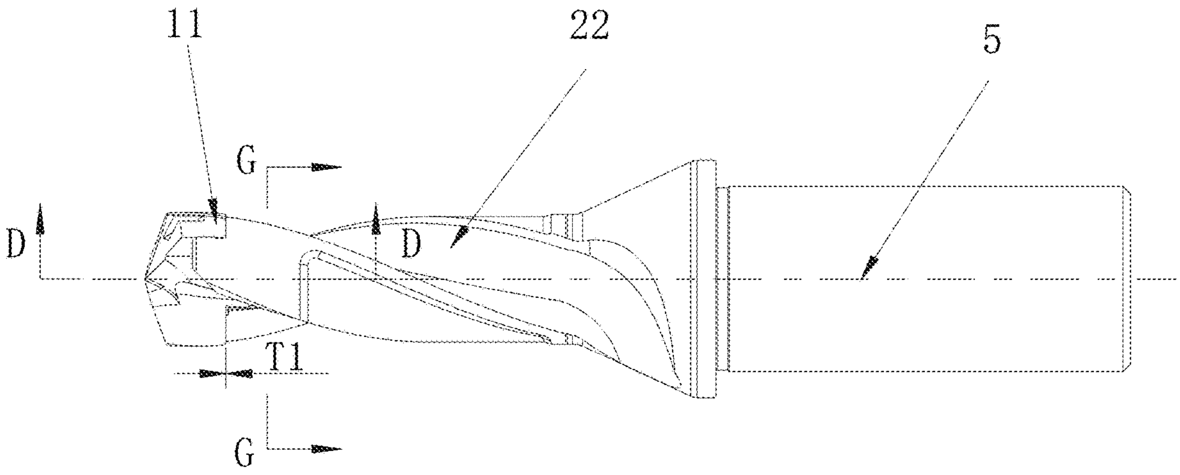
FIG. 9 is a front view of a drilling tool featuring stable radial clamping according to the invention.
Figure 10:
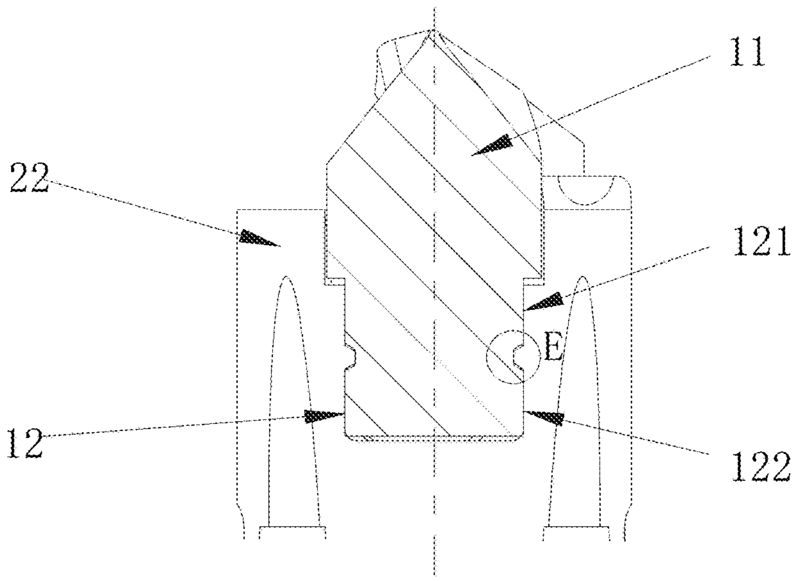
FIG. 10 is a sectional view of D-D in FIG. 9.
Figure 11:
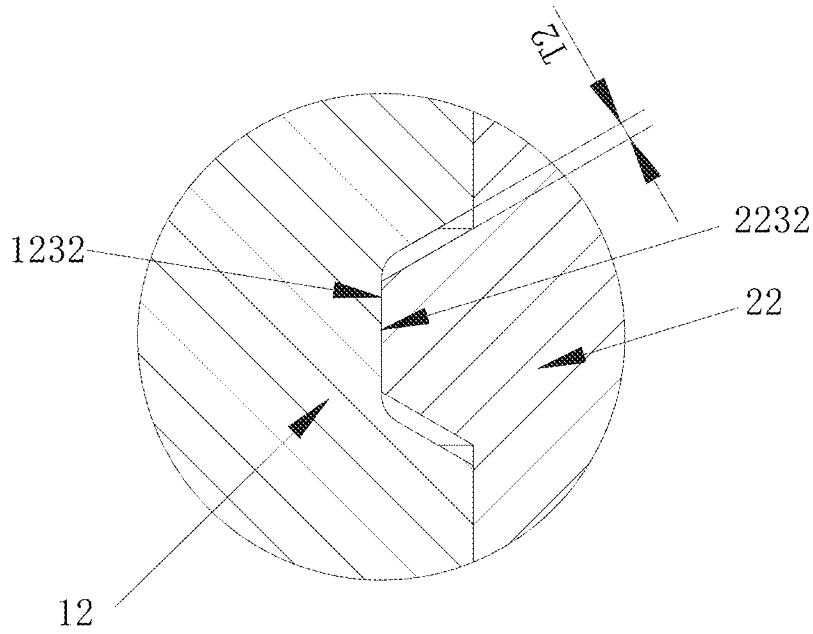
FIG. 11 is an enlarged view of E in FIG. 10.
Figure 12:
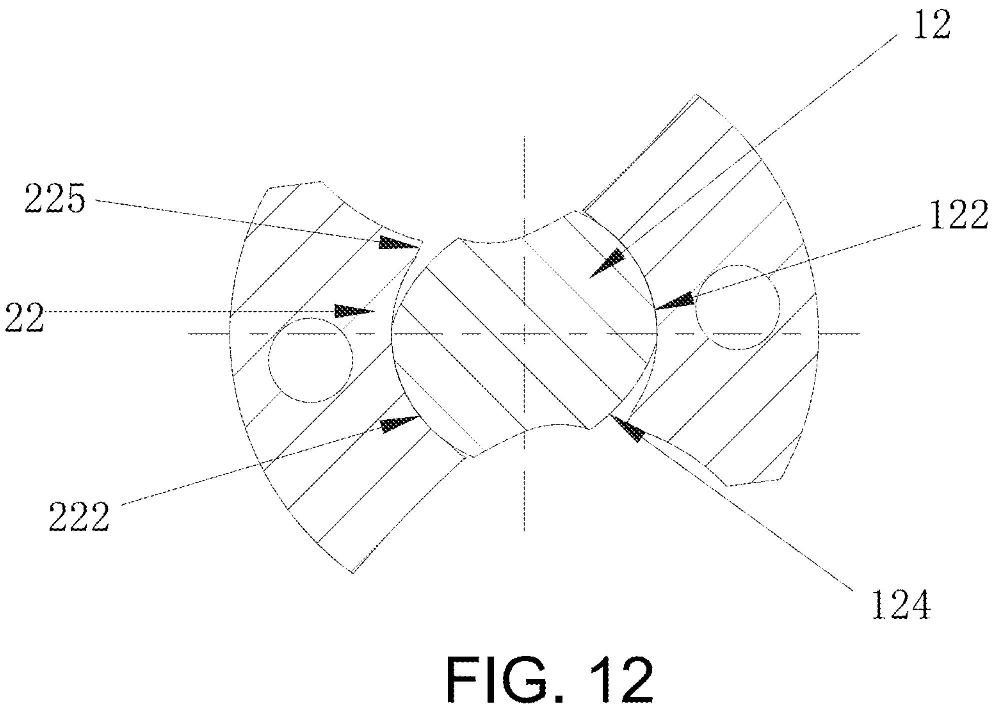
FIG. 12 is a sectional view of G-G in FIG. 9.

FIGS. 1-12 show an embodiment of a drilling tool featuring stable radial clamping provided by the invention. The drilling tool featuring stable radial clamping comprises a cutting component 1 and a clamping component 2, wherein the cutting component 1 comprises a cutting part 11 and a connecting part 12; the clamping component 2 comprises a handle part 21 and a clamping part 22, two chip grooves 4 are formed in the clamping part 22 to form a two-piece clamping structure, and the cutting component 1 is matched with the clamping part 22; in a direction away from the cutting part 11 along a rotation center axis 5 of the drilling tool, the connecting part 12 is sequentially provided with a first outer circumferential surface 121 and a second outer circumferential surface 122; and in a direction away from the cutting part 11 along a rotation center axis 5 of the drilling tool, the clamping part 22 is sequentially provided with a first inner circumferential surface 221 and a second inner circumferential surface 222; the first inner circumferential surface 221 is matched with the first outer circumferential surface 121 to form a first radial clamping structure, and the second inner circumferential surface 222 is matched with the second outer circumferential surface 122 to form a second radial clamping structure; and the first radial clamping structure and the second radial clamping structure are capable of independently achieving radial clamping of the cutting component 1 by the clamping component 2, and an interference amount of the first radial clamping structure is greater than that of the second radial clamping structure. The drilling tool featuring stable radial clamping has two groups of radial clamping structures which are arranged radially away from the cutting part 11. The interference amount of the first radial clamping structure is greater than that of the second radial clamping structure, meaning that the first clamping structure has a greater clamping force compared to the second clamping structure, while the second clamping structure has a greater clamping area compared to the first clamping structure. The two groups of radial clamping structures work together, increasing the clamping area and clamping force during the assembly of the clamping component 2 and the cutting component 1, thereby improving the connection strength of the tool. This ensures high drilling precision even under conditions of large length-to-diameter ratios and high feed rates. The two groups of radial clamping structures have different interference amounts, and the interference amount of the first clamping structure is greater than that of the second clamping structure, which facilitates assembly and effectively reduces the difficulty of tool manufacturing. The setting of the dual clamping structures can also effectively suppress the deflection of the cutting component 1 caused by unstable clamping, greatly reducing fatigue damage to the clamping component 2 and extending the lifespan of the tool.

In this embodiment, the first radial clamping structure has an interference amount 21, and the second radial clamping structure has an interference amount 22. Upon assembly, the clamping component 2 will open by a small angle. Due to the first inner circumferential surface 221 being further from an opening pivot point than the second inner circumferential surface 222, an opening amount of the first inner circumferential surface 221 is greater than that of the second inner circumferential surface 222. In order to ensure both the first radial clamping structure and the second clamping structure achieve clamping, the following condition should be met: 0.005 mm≤80 1−$\lambda$2≤0.02 mm. In this embodiment, $\lambda$1=0.015 mm and $\lambda$2=0.01 mm.

In this embodiment, a length of the first outer circumferential surface 121 along the rotation center axis 5 of the drilling tool is L1, and a length of the second outer circumferential surface 122 along the rotation center axis 5 of the drilling tool is L2. To concentrate the main clamping area on the first clamping structure, the following condition should be met: 0.2 mm≤L1−L2≤1.5 mm. In this embodiment, L1=3.5 mm and L2=3 mm.

In this embodiment, on an axial section of the drilling tool, an included angle between the first outer circumferential surface 121 and the rotation center axis 5 of the drilling tool is $\alpha$1, and an included angle between the first inner circumferential surface 221 and the rotation center axis 5 of the drilling tool is $\alpha$2. In order to increase the clamping area of the first clamping structure, a slight angular difference can be introduced between the first inner circumferential surface 221 and the first outer circumferential surface 121 to compensate for the small angle of the clamping component 2, with the condition 0°<$\alpha$1−$\alpha$2<1° being met. In this embodiment, $\alpha$1=0.5° and $\alpha$2=0°.

In this embodiment, $\alpha$2=0, that is, on the axial section of the drilling tool, the first inner circumferential surface 221 is parallel to the rotation center axis 5 of the drilling tool, thus reducing the difficulty in manufacturing the tool.

In this embodiment, on any axial section of the drilling tool, the second outer circumferential surface 122 is parallel to the rotation center axis 5, and the second inner circumferential surface 222 is parallel to the rotation center axis 5, thus reducing the difficulty in manufacturing the tool.

In this embodiment, a circumferential recess 123 is arranged between the first outer circumferential surface 121 and the second outer circumferential surface 122, a circumferential protrusion 223 is arranged between the first inner circumferential surface 221 and the second inner circumferential surface 222, and the circumferential recess 123 is matched with the circumferential protrusion 223.

In this embodiment, the circumferential recess 123 comprises a concave upper side 1231, a concave bottom 1232 and a concave lower side 1233 which are arranged in sequence, the circumferential protrusion 223 comprises a convex upper side 2231, a convex top 2232 and a convex lower side 2233 which are arranged in sequence, and the concave bottom 1232 is matched with the convex top 2232 to form a third radial clamping structure, further improving the connection strength and positioning accuracy of the tool.

In this embodiment, on an axial section of the drilling tool, an included angle between the concave upper side 1231 and the concave lower side 1233 is $\beta$1, and an included angle between the convex upper side 2231 and the convex lower side 2233 is $\beta$2. To facilitate manufacturing and assembly, the following conditions should be met: 45°≤$\beta$1≤60° and 45°≤$\beta$2≤60°. In this embodiment, $\beta$1=$\beta$2=45°.

In this embodiment, the cutting part 11 is provided with a cutting part end surface 111, and the clamping part 22 is provided with a clamping part end surface 224; and when the cutting component 1 and the clamping component 2 are assembled in place, a gap T1 exists between the cutting part end surface 111 and the clamping part end surface 224, and a gap T2 exists between the concave lower side 1233 and the convex lower side 2233. In order to reduce the difficulty in manufacturing the tool and ensure that the gap between the cutting part end surface 111 and the clamping part end surface 224 of the drilling tool is zero, the following condition should be met: 0<T2−T1<0.2 mm. In this embodiment, T2=0.3 mm and T1=0.1 mm.

In this embodiment, the connecting part 12 is provided with a relief outer circumferential surface 124, the relief outer circumferential surface 124 is arranged on a side, close to the rotation center axis 5, of the second outer circumferential surface 122, the clamping part 22 is provided with a relief inner circumferential surface 225, and the relief inner circumferential surface 225 is arranged on a side, away from the rotation center axis 5, of the second inner circumferential surface 222, so as to facilitate the smooth and accurate insertion of the cutting component 1 into the clamping component 2 during assembly.

Although the invention has been disclosed by means of preferred embodiments, they are not intended to limit the invention. Any person skilled in the art can make many possible changes and modifications to the technical scheme of the invention by using the technical contents disclosed above, or modify it into equivalent embodiments with equivalent changes without departing from the scope of the technical scheme of the invention. Therefore, any simple revision, equivalent change and modification of the above embodiments according to the technical essence of the invention that does not depart from the content of the technical scheme of the invention shall fall within the protection scope of the technical scheme of the invention.

What is claimed is:

1. A drilling tool featuring stable radial clamping, the drilling tool comprising a cutting component and a clamping component, wherein the cutting component comprises a cutting part and a connecting part; the clamping component comprises a handle part and a clamping part, two chip grooves are formed in the clamping part to form a two-piece clamping structure, and the cutting component is matched with the clamping part; in a direction away from the cutting part along a rotation center axis of the drilling tool, the connecting part is sequentially provided with a first outer circumferential surface and a second outer circumferential surface; in the direction away from the cutting part along the rotation center axis of the drilling tool, the clamping part is sequentially provided with a first inner circumferential surface and a second inner circumferential surface; the first inner circumferential surface is matched with the first outer circumferential surface to form a first radial clamping structure, and the second inner circumferential surface is matched with the second outer circumferential surface to form a second radial clamping structure; and the first radial clamping structure and the second radial clamping structure are capable of independently achieving radial clamping of the cutting component by the clamping component, and an interference amount of the first radial clamping structure is greater than that of the second radial clamping structure.

2. The drilling tool featuring stable radial clamping according to claim 1, wherein the first radial clamping structure has an interference amount $\lambda 1$, the second radial clamping structure has an interference amount $\lambda 2$, and 0.005 mm$\leq\lambda 1-\lambda 2\leq$0.02 mm.

3. The drilling tool featuring stable radial clamping according to claim 2, wherein on an axial section of the drilling tool, an included angle between the first outer circumferential surface and the rotation center axis of the drilling tool is al, an included angle between the first inner circumferential surface and the rotation center axis of the drilling tool is $\alpha 2$, and $0°<\alpha 1-\alpha 2<1°$.

4. The drilling tool featuring stable radial clamping according to claim 3, wherein $\alpha 2=0$.

5. The drilling tool featuring stable radial clamping according to claim 3, wherein on any axial section of the drilling tool, the second outer circumferential surface is parallel to the rotation center axis, and the second inner circumferential surface is parallel to the rotation center axis.

6. The drilling tool featuring stable radial clamping according to claim 2, wherein a circumferential recess is arranged between the first outer circumferential surface and the second outer circumferential surface, a circumferential protrusion is arranged between the first inner circumferential surface and the second inner circumferential surface, and the circumferential recess is matched with the circumferential protrusion.

7. The drilling tool featuring stable radial clamping according to claim 6, wherein the circumferential recess comprises a concave upper side, a concave bottom and a concave lower side which are arranged in sequence, the circumferential protrusion comprises a convex upper side, a convex top and a convex lower side which are arranged in sequence, and the concave bottom is matched with the convex top to form a third radial clamping structure.

8. The drilling tool featuring stable radial clamping according to claim 7, wherein on an axial section of the drilling tool, an included angle between the concave upper side and the concave lower side is $\beta 1$, an included angle between the convex upper side and the convex lower side is $\beta 2$, $45°\leq\beta 1\leq 60°$ and $45°\leq\beta 2\leq 60°$.

9. The drilling tool featuring stable radial clamping according to claim 1, wherein a length of the first outer circumferential surface along the rotation center axis of the drilling tool is L1, a length of the second outer circumferential surface along the rotation center axis of the drilling tool is L2, and 0.2 mm$\leq$L1$-$L2$\leq$1.5 mm.

10. The drilling tool featuring stable radial clamping according to claim 9, wherein the connecting part is provided with a relief outer circumferential surface, the relief outer circumferential surface is arranged on a side, adjacent to the rotation center axis, of the second outer circumferential surface, the clamping part is provided with a relief inner circumferential surface, and the relief inner circumferential surface is arranged on a side, away from the rotation center axis, of the second inner circumferential surface.

11. The drilling tool featuring stable radial clamping according to claim 9, wherein on an axial section of the drilling tool, an included angle between the first outer circumferential surface and the rotation center axis of the drilling tool is $\alpha 1$, an included angle between the first inner circumferential surface and the rotation center axis of the drilling tool is $\alpha 2$, and $0°<\alpha 1-\alpha 2<1°$.

12. The drilling tool featuring stable radial clamping according to claim 11, wherein $\alpha 2=0$.

13. The drilling tool featuring stable radial clamping according to claim 11, wherein on any axial section of the drilling tool, the second outer circumferential surface is parallel to the rotation center axis, and the second inner circumferential surface is parallel to the rotation center axis.

14. The drilling tool featuring stable radial clamping according to claim 1, wherein on an axial section of the drilling tool, an included angle between the first outer circumferential surface and the rotation center axis of the drilling tool is al, an included angle between the first inner circumferential surface and the rotation center axis of the drilling tool is $\alpha 2$, and $0°<\alpha 1-\alpha 2<1°$.

15. The drilling tool featuring stable radial clamping according to claim 14, wherein $\alpha 2=0$.

16. The drilling tool featuring stable radial clamping according to claim 14, wherein on any axial section of the drilling tool, the second outer circumferential surface is parallel to the rotation center axis, and the second inner circumferential surface is parallel to the rotation center axis.

17. The drilling tool featuring stable radial clamping according to claim 1, wherein a circumferential recess is arranged between the first outer circumferential surface and the second outer circumferential surface, a circumferential protrusion is arranged between the first inner circumferential surface and the second inner circumferential surface, and the circumferential recess is matched with the circumferential protrusion.

18. The drilling tool featuring stable radial clamping according to claim 17, wherein the circumferential recess comprises a concave upper side, a concave bottom and a concave lower side which are arranged in sequence, the circumferential protrusion comprises a convex upper side, a convex top and a convex lower side which are arranged in sequence, and the concave bottom is matched with the convex top to form a third radial clamping structure.

19. The drilling tool featuring stable radial clamping according to claim 18, wherein on an axial section of the drilling tool, an included angle between the concave upper side and the concave lower side is $\beta 1$, an included angle between the convex upper side and the convex lower side is $\beta 2$, $45°\leq\beta 1\leq 60°$ and $45°\leq\beta 2\leq 60°$.

20. The drilling tool featuring stable radial clamping according to claim 18, wherein the cutting part is provided with a cutting part end surface, and the clamping part is provided with a clamping part end surface; and when the cutting component and the clamping component are assembled in place, a gap T1 exists between the cutting part end surface and the clamping part end surface, a gap T2 exists between the concave lower side and the convex lower side, and 0<T2$-$T1<0.2 mm.

* * * * *